United States Patent [19]

Yamagami

[11] Patent Number: 5,031,114
[45] Date of Patent: Jul. 9, 1991

[54] METHOD AND APPARATUS FOR CLIPPING FIGURES AGAINST A CLIPPING FRAME USING LINE SEGMENT CROSS POINT AND AREA DETECTION

[75] Inventor: Nobuhiko Yamagami, Tokyo, Japan

[73] Assignee: Kabushiki Kaisha Toshiba, Kawasaki, Japan

[21] Appl. No.: 175,349

[22] Filed: Mar. 30, 1988

[30] Foreign Application Priority Data

Mar. 31, 1987 [JP] Japan .................. 62-78642

[51] Int. Cl.$^5$ .............................. G06F 15/62
[52] U.S. Cl. ................... 364/518; 364/521; 340/747; 340/739
[58] Field of Search ......... 364/518, 521, 522; 340/747, 739, 750, 734, 800

[56] References Cited

U.S. PATENT DOCUMENTS

| | | | |
|---|---|---|---|
| 4,623,880 | 11/1986 | Bresenham et al. | 340/723 |
| 4,656,468 | 4/1987 | Takikawa et al. | 340/744 |
| 4,736,200 | 4/1988 | Oununma | 340/734 |
| 4,814,755 | 3/1989 | Johnson et al. | 340/709 |
| 4,823,282 | 4/1989 | Yamagami | 364/518 |
| 4,849,907 | 7/1989 | Aotsu et al. | 364/518 |

FOREIGN PATENT DOCUMENTS 62-27872 2/1987 Japan .

Primary Examiner—Gary V. Harkcom
Assistant Examiner—Raymond J. Bayerl
Attorney, Agent, or Firm—Foley & Lardner

[57] ABSTRACT

In order to clip a figure using a predetermined frame, coordinate values of cross points defined by a line segment representing a figure to be clipped and each side of the clipping frame or each extension line thereof are detected. A positional relationship between the line segment and the clipping frame, and the presence/absence of the cross points on the clipping frame are obtained, respectively. By utilizing the above information, a new boundary line which does not exist in a figure before clipping can be extracted. Since the detection of cross point coordinates and the extraction of boundaries are independently processed, high-speed processing can be realized.

5 Claims, 10 Drawing Sheets

CASE 5a

CASE 5b

CASE 6b

CASE 6b

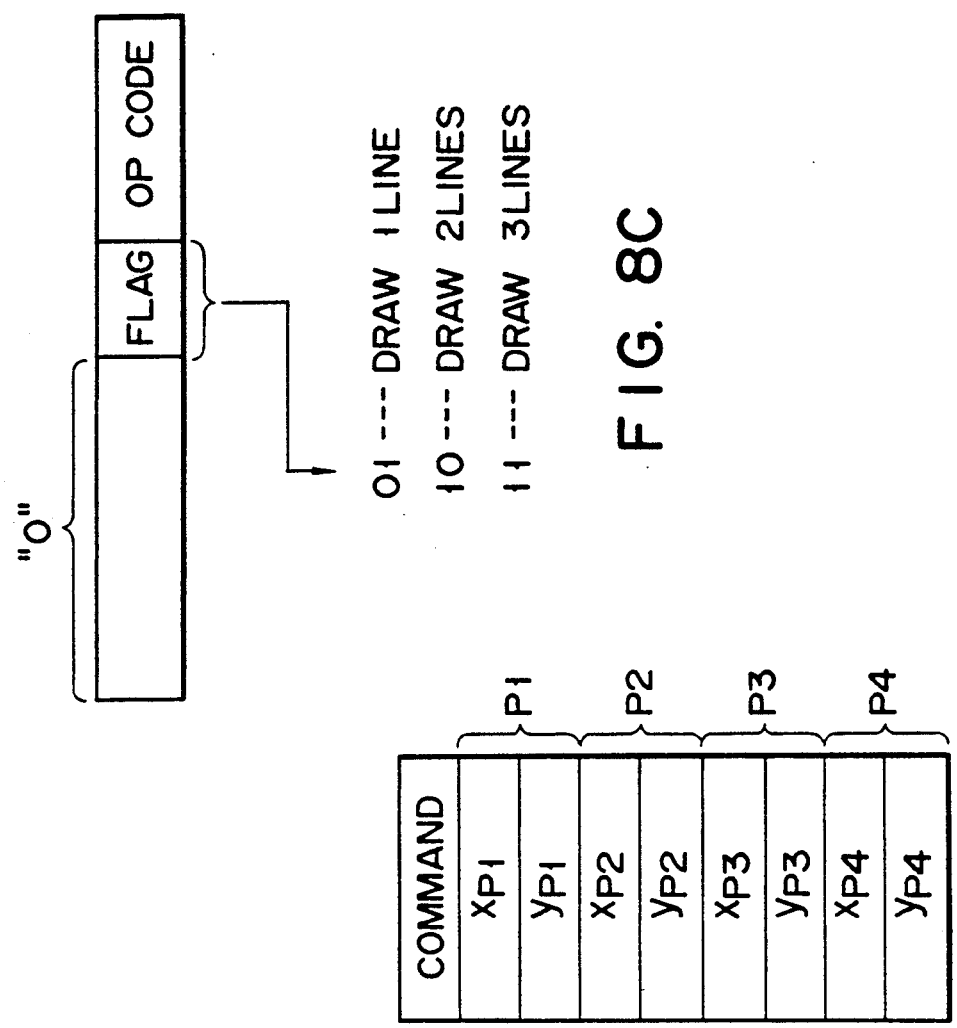

METHOD AND APPARATUS FOR CLIPPING FIGURES AGAINST A CLIPPING FRAME USING LINE SEGMENT CROSS POINT AND AREA DETECTION

BACKGROUND OF THE INVENTION

1. Field of the Invention

The present invention relates to a method and apparatus for clipping figures using predetermined frames.

2. Description of the Related Art

According to a conventional method, in order to execute processing for painting out an area (a portion indicated by hatched lines in FIG. 1A) surrounded by boundary lines using a graphic display, all boundaries are written in a frame memory, and then a necessary portion is painted out while positions of the boundaries are read out along scanning lines. In this case, however, the boundaries must be closed, thereby imposing limitations.

In graphic processing, it is generally practiced that a portion of a figure is cut out and displayed using predetermined clipping frame W (refer to FIG. 1A). For example, in a figure shown in FIG. 1A, when a figure (refer to FIG. 1B) cut out by clipping frame W is to be displayed with the above method, new boundary lines B which do not exist before the figure is cut out must be extracted. Since extraction of boundary lines B is performed by a processor, a processing speed is decreased.

Therefore, it is desirable that extraction of new boundary lines which do not exist in a figure to be clipped is performed at a high speed.

SUMMARY OF THE INVENTION

It is an object of the present invention to provide a method and apparatus for clipping figures, which allows high-speed extraction of new boundary lines which do not exist in a figure to be clipped.

According to the present invention, there is provided a method for clipping a figure comprising:

a first step of storing coordinate values of a line segment representing a boundary of a figure to be clipped and coordinate values of the clipping frame;

a second step of determining existing areas of the coordinate values of the stored line segment in areas divided by each side and extension line of the clipping frame;

a third step of latching data indicating the existing areas of the coordinate values of the line segment;

a fourth step of determining a positional relationship between the line segment and the areas in accordance with the latched data and data indicating existing areas of coordinate values of a newly stored line segment;

a fifth step of detecting cross point coordinate values defined by the line segment, each side of the clipping frame, and each extension line in accordance with the coordinate values of the line segment and coordinate values of the clipping frame stored by the first step, and determining the presence/absence of the detected cross point coordinate values in the clipping frame;

a sixth step of determining a cross state between the line segment, each side of the clipping frame, and each extension line in accordance with the data indicating the presence/absence of the cross point coordinate values detected by the fifth step and data indicating the positional relationship determined by the fourth step; and a seventh step of outputting coordinate values of a line segment representing a boundary of the clipped figure among the coordinate values of the clipping frame, the coordinate values of the line segment, and the cross point coordinate values defined by the line segment, each side of the clipping frame, and each extension line in accordance with the data indicating the existing areas of the coordinate values of the line segment determined by the second step and the data indicating the cross state between the line segment, each side of the clipping frame, and each extension thereof determined by the sixth step.

Furthermore, according to the present invention, there is provided an apparatus for clipping a figure, comprising:

storage means for storing coordinate values of a line segment representing a boundary of a figure to be clipped and coordinate values of the clipping frame;

first determination means for determining existing areas of the coordinate values of the line segment output from the storage means in areas divided by each side and each extension line of the clipping frame;

latch means for latching the data indicating the existing areas of the coordinate values of the line segment output from the first determination means;

second determination means for determining a positional relationship between the line segment and the areas in accordance with the data latched by the latch means and data indicating existing areas of coordinate values of a line segment newly input to the first determination means from the storage means;

cross point detecting means for detecting cross point coordinate values defined by the line segment, each side of the clipping frame, and each extension line in accordance with the coordinate values of the line segment output from the storage means and the coordinate values of the clipping frame, and determining the presence/absence of the detected cross point coordinate values in the clipping frame;

third determination means for determining a cross state between the line segment, each side of the clipping frame, and each extension line, in accordance with the data indicating the presence/absence of the cross point coordinate values detected by the cross point detecting means and data indicating the positional relationship determined by the second determination means; and clipping coordinate output means for outputting coordinate values of a line segment representing boundary of a clipped figure among the coordinate values of the clipping frame, the coordinate values of the line segment, and the cross point coordinate values defined by the line segment and the clipping frame in accordance with the data indicating the existing areas of the coordinate values of the line segment output from the first determination means, and the data indicating the cross state between the line segment, each side of the clipping frame, and each extension line thereof output from the third determination means.

BRIEF DESCRIPTION OF THE DRAWINGS

FIG. 8A is a format of a command array output from the boundary cutout unit;

FIG. 8B is boundary lines extracted by the clipping frame; and

FIG. 8C is a format of each command of the command array.

DETAILED DESCRIPTION OF THE PREFERRED EMBODIMENT

An embodiment of the present invention will be now described below with reference to the accompanying drawings.

Figure 1B:
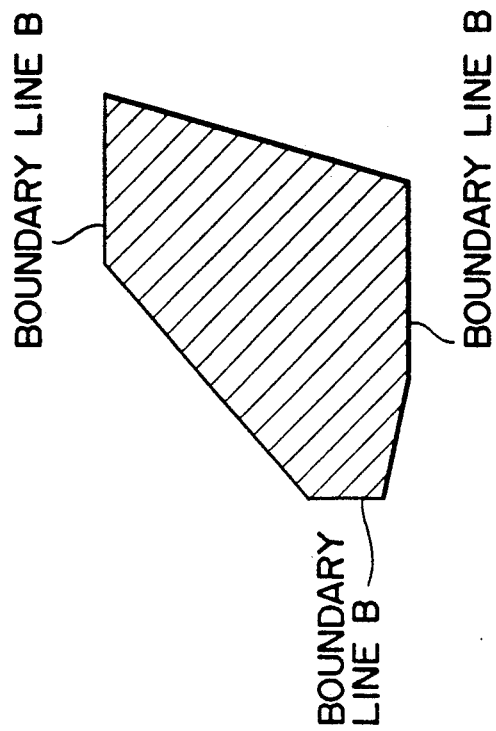
FIGS. 1A and 1B are views showing clipping of a figure.
Figure 1A:
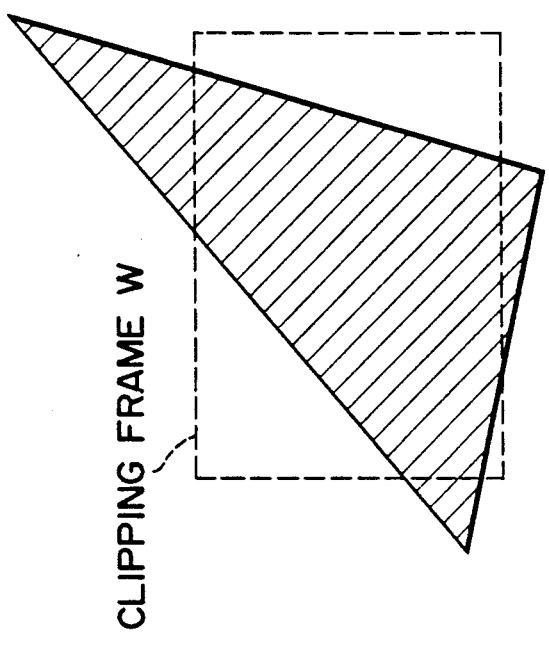
Figure 2:
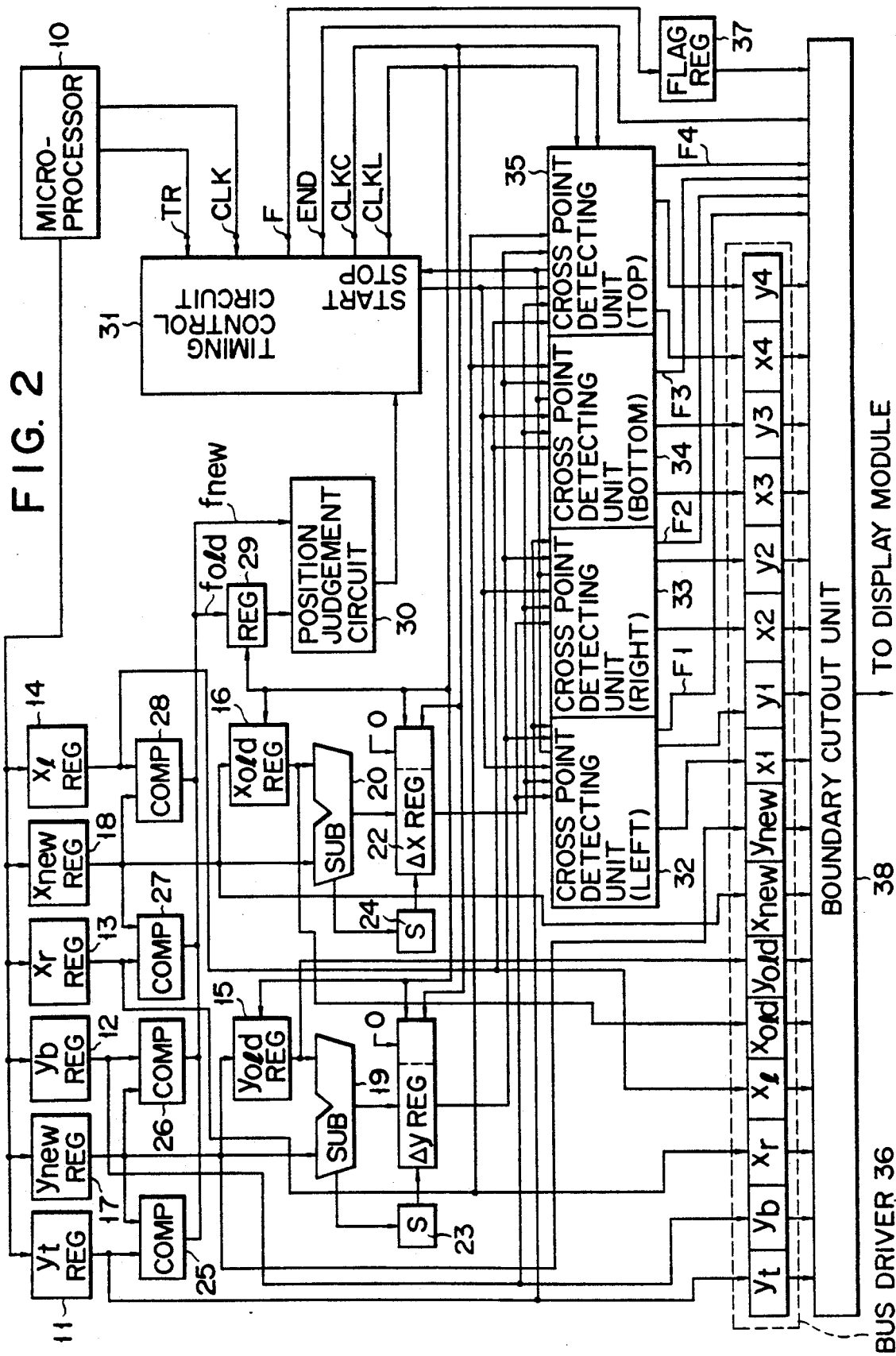
FIG. 2 is a block diagram of an apparatus for clipping figures according to an embodiment of the present invention.
Figure 3:
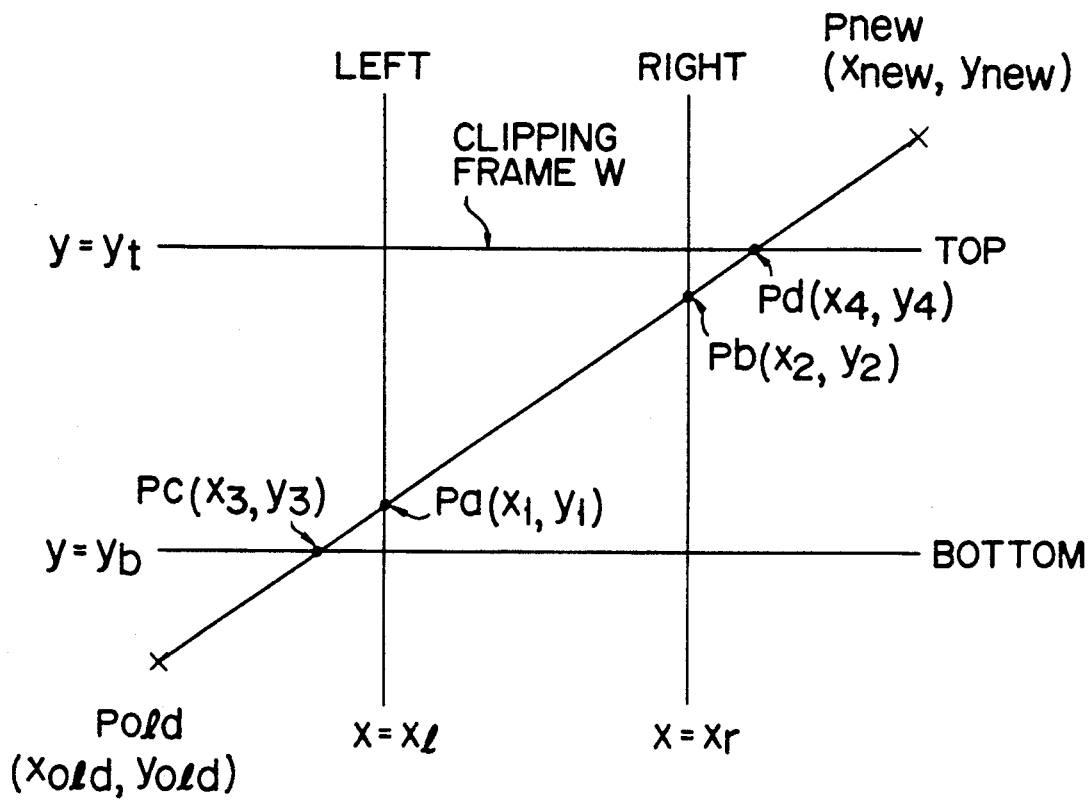
FIG. 3 is a view illustrating a clipping frame.

In an apparatus shown in FIG. 2, y-coordinate value yt of an upper side (Top) of clipping frame W (refer to FIG. 3), y-coordinate value yb of a lower side (Bottom) of frame W, x-coordinate value xr of a right side (Right) of frame W, and x-coordinate value xl of a left side (Left) of frame W are held in yt register (yt REG) 11, yb register (yb REG) 12, xr register (xr REG) 13, and xl register (xl REG) 14, respectively. X-coordinate value xold and y-coordinate value yold of start point Pold of a line segment of boundaries of a figure to be clipped are respectively held in xold register (xold REG) 16 and yold register (yold REG) 15, and x-coordinate value xnew and y-coordinate value ynew of an end point thereof are respectively held in xnew register (xnew REG) 18 and ynew register (ynew REG) 17.

Subtracter (SUB) 19 calculates displacement $\Delta y$ of a line segment of the figure to be clipped by subtracting y-coordinate value ynew held in ynew REG 17 from y-coordinate value yold held in yold REG 15. Subtracter (SUB) 20 calculates displacement $\Delta x$ of the line segment of the figure to be clipped by subtracting x-coordinate value xnew held in xnew REG 18 from x-coordinate value xold held in xold REG 16.

$\Delta y$ shift register ($\Delta y$ REG) 21 and $\Delta x$ shift register ($\Delta x$ REG) 22 respectively store displacements $\Delta y$ and $\Delta x$ obtained by SUBs 19 and 20 in accordance with clock signal CLKL output from timing control circuit 31, and then repeatedly obtain ½ the values of displacements $\Delta y$ and $\Delta x$ by repeating arithmetic shift by one bit to the right in synchronism with clock signal CLKC. Flip-flops (Ss) 23 and 24 respectively hold sign bits of displacements $\Delta y$ and $\Delta x$ obtained by SUBs 19 and 20. When arithmetic shift by one bit to the right is performed in $\Delta y$ REG 21 and $\Delta x$ REG 22, the sign bits output from flip-flops 23 and 24 are respectively input to the most significant bits of $\Delta y$ REG 21 an $\Delta x$ REG 22.

Figure 4:
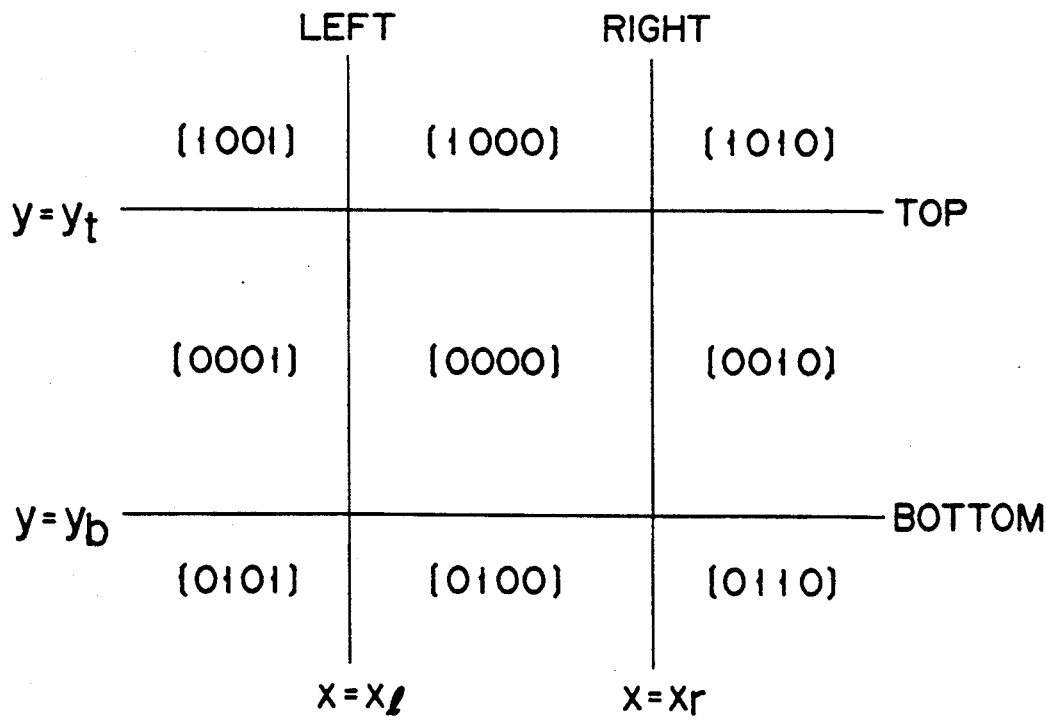
FIG. 4 is a view showing areas for defining a positional relationship between a line segment of a figure to be clipped and the clipping frame.

Comparator (COMP) 25 compares y-coordinate value ynew held in ynew REG 17 with y-coordinate value yt held in yt REG 11. Comparator (COMP) 26 compares y-coordinate value ynew held in ynew REG 17 with y-coordinate values yb held in yb REG 12. Comparator (COMP) 27 compares x-coordinate value xnew held in xnew REG 18 with x-coordinate value xr held in xr REG 13. Comparator (COMP) 28 compares x-coordinate value xnew held in xnew REG 18 with x-coordinate value xl held in xl REG 14. When ynew>yt or ynew<yb, signals output from COMPs 25 and 26 are respectively set at logic "1". Otherwise, both the signals are set at logic "0". In addition, when xnew>xr or xnew<xl, signals output from COMPs 27 and 28 are respectively set at logic "1". Otherwise, the signals are set at logic "0". As shown in FIG. 4, 4-bit data represented by the signals output from COMPs 25 to 28 are used as flag data indicating which the coordinate values held in xnew and ynew REGs 18 and 17 are included in areas of nine areas defined by each side of clipping frame W and its each extension line.

Figure 5A:
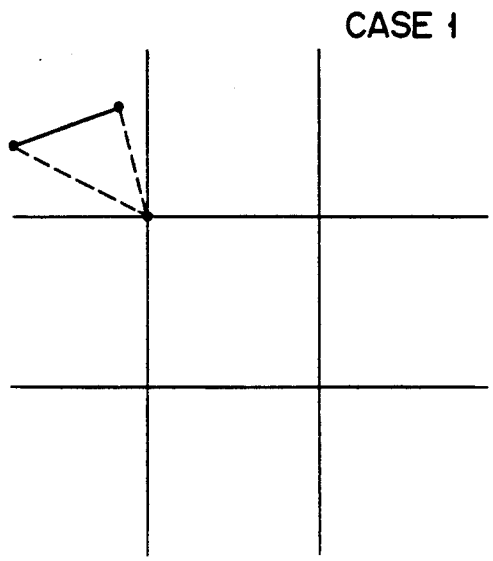
FIGS. 5A to 5P are views classifying extracted boundary lines determined by positional relationships between line segments of a figure to be clipped and a clipping frame.
Figure 5B:
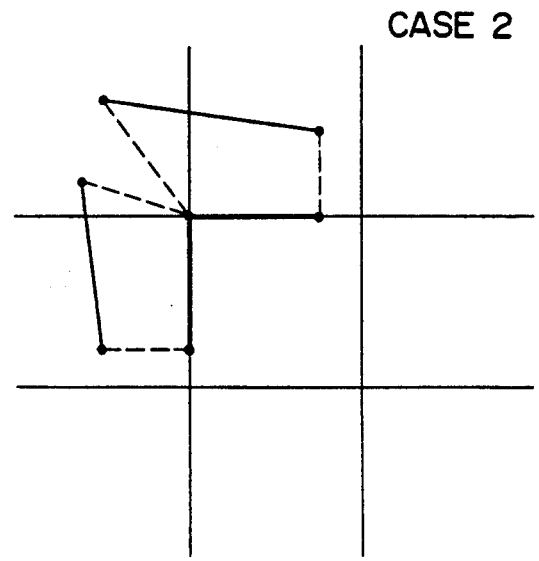
Figure 5C:
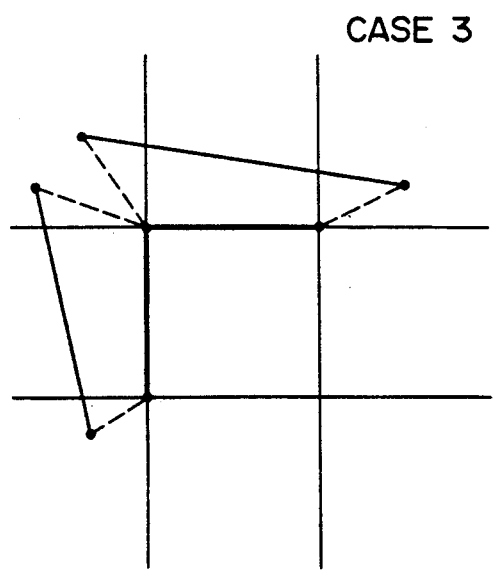
Figure 5D:
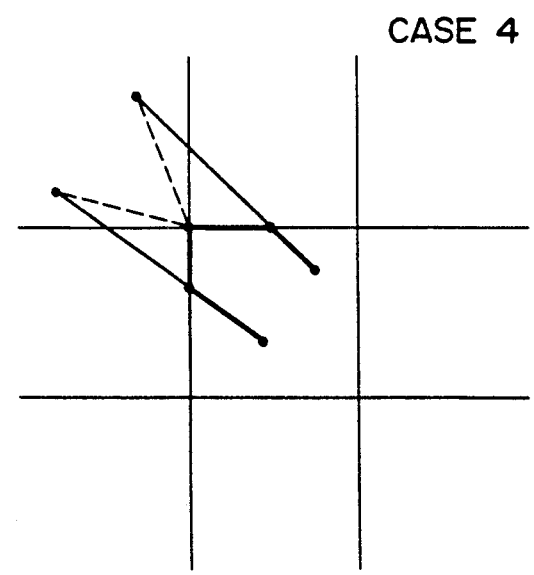
Figure 5E:
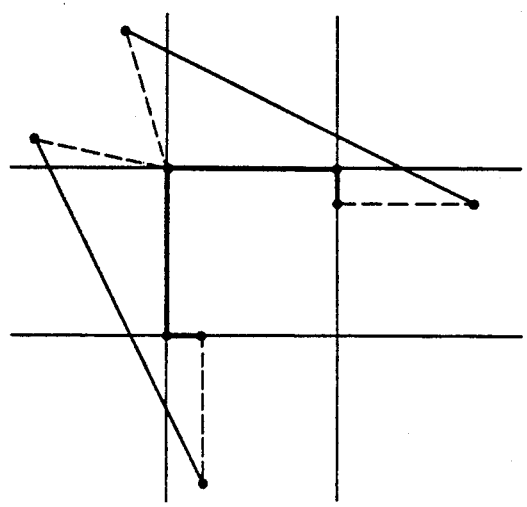
Figure 5F:
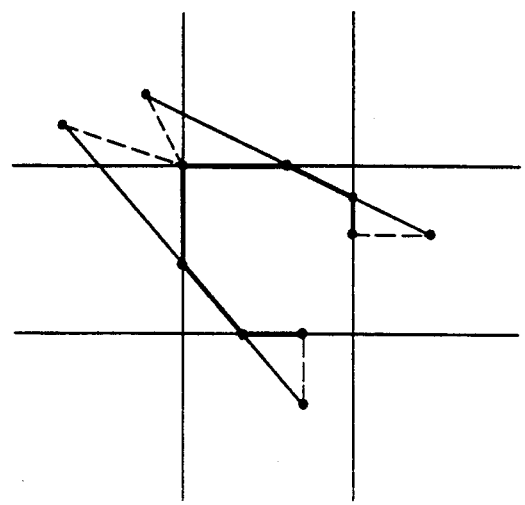
Figure 5G:
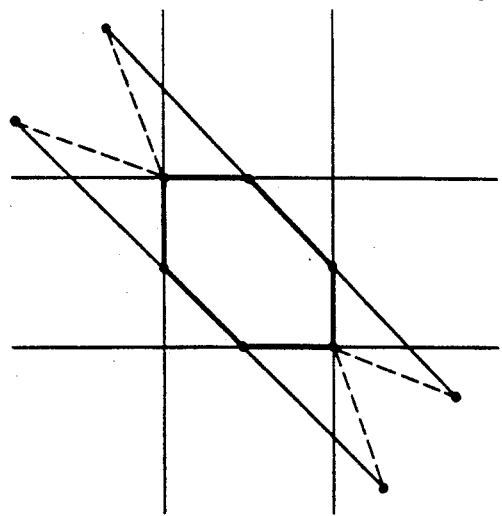
Figure 5H:
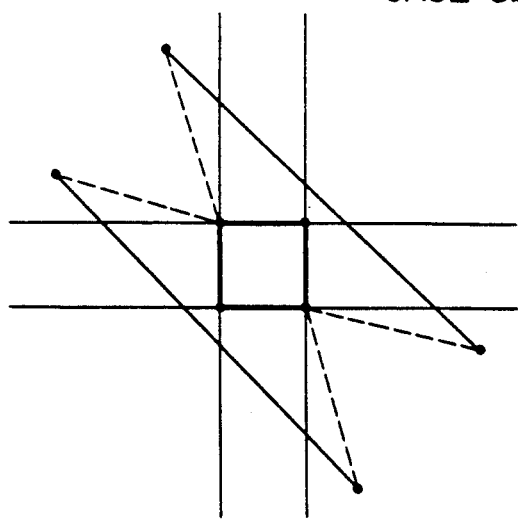
Figure 5I:
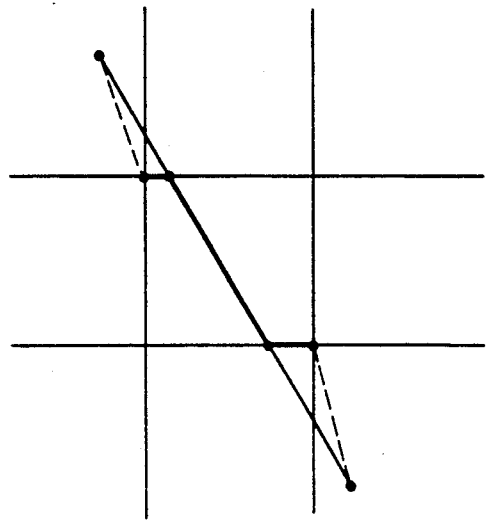
Figure 5J:
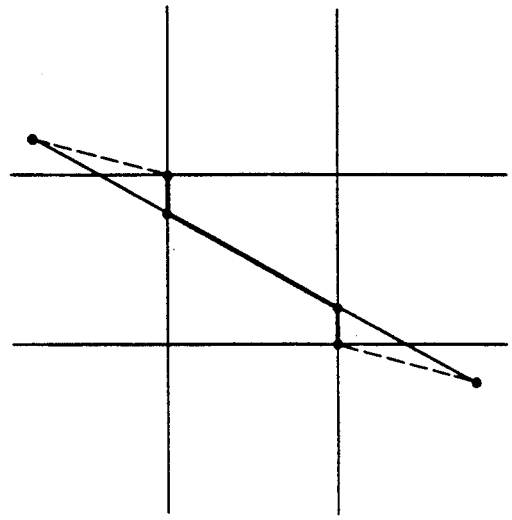
Figure 5K:
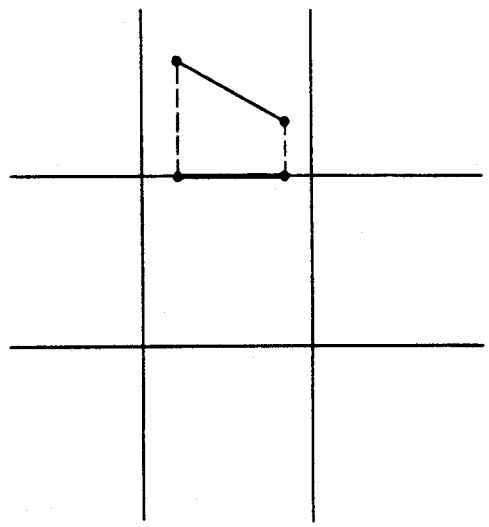
Figure 5L:
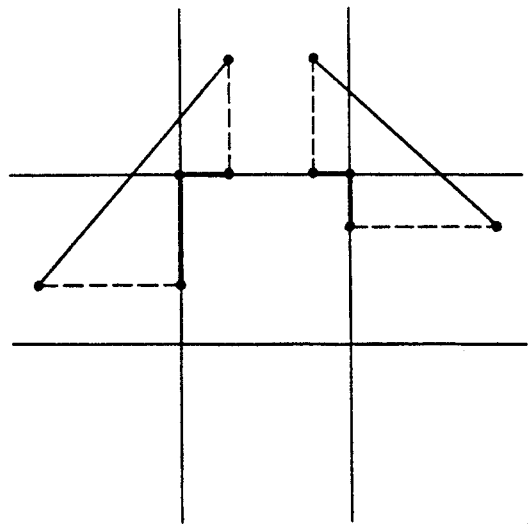
Figure 5M:
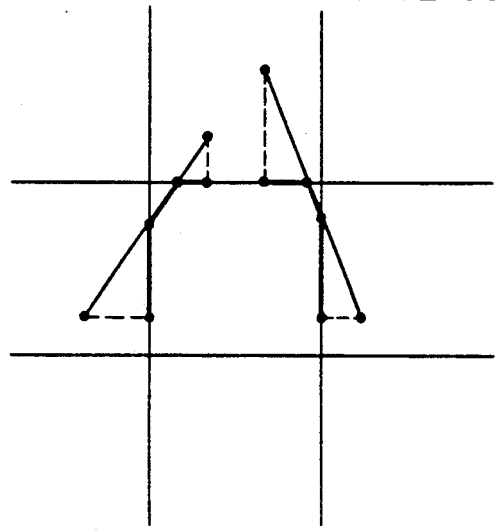
Figure 5N:
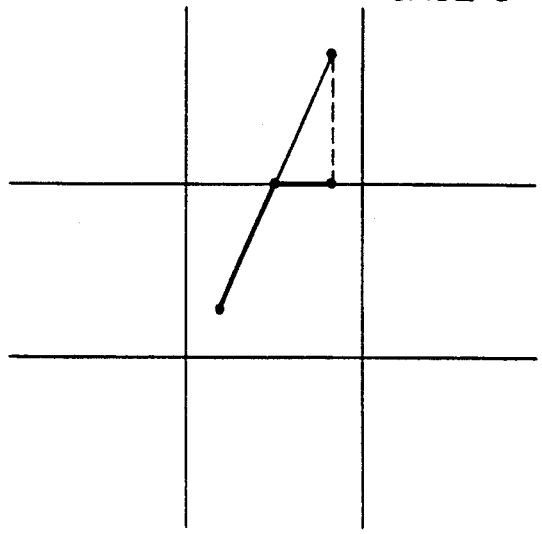
Figure 5O:
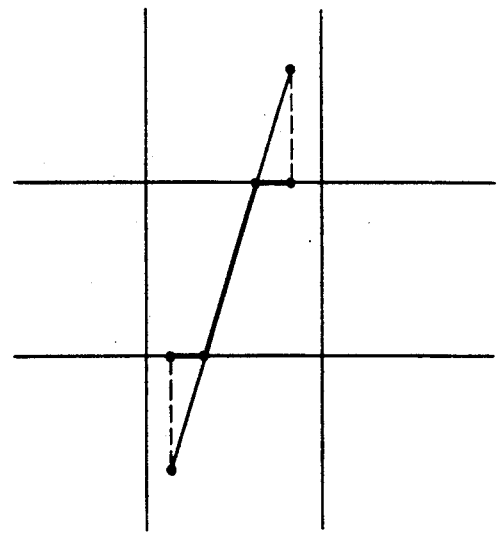
Figure 5P:
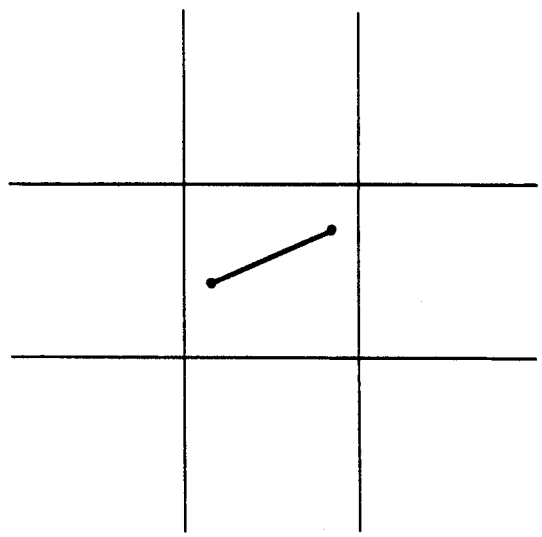

Register (REG) 29 latches the signals output from COMPs 25 to 28 in accordance with clock signal CLKL. Position judgement circuit 30 judges a positional relationship between a line segment and clipping frame W in accordance with 4-bit data $f_{new}$ (indicating an area of the nine areas shown in FIG. 4, where an end point of the line segment is present) represented by the signals output from COMPs 25 to 28, and 4-bit data $f_{old}$ (indicating an area of the nine areas shown in FIG. 4, where start point of the line segment is present) held in REG 29, thereby outputting flag data representing the positional relationship to circuit 31. The positional relationship between the line segment and clipping frame W judged by position judgement circuit 30 represents types of boundaries extracted after clipping of a figure, as shown in FIGS. 5A to 5P. They are classified into 11 types, i.e., cases 1 to 11 as follows: (1) both the ends of a line segment are located in a single corner area (case 1), (2) one end of a line segment is located in a corner area and the other end thereof is located on its adjacent side (case 2), (3) one end of a line segment is located in a corner area and the other end thereof is located in its adjacent corner area (case 3), (4) one end of a line segment is located in a corner area and the other end thereof is located in the central area, (5) one end of a line segment is located in a corner area and the other end thereof is located in a side area which is not adjacent to the corner area (cases 5a and 5b), (6) one end of a line segment is located in a corner area and the other end thereof is located in an opposite corner area (cases 6a to 6d), (7) both the ends of a line segment are located on a single side (case 7), (8) one end of a line segment is located on a side and the other end thereof is located on its adjacent side (cases 8a and 8b), (9) one end of a line segment is located on a side and the other end thereof is located in the central area (case 9), (10) one end of a line segment is located on a side and the other end thereof is located on an opposite side (case 10), and (11) both the ends of a line segment are located in the central area (case 11). Note that each boundary to be extracted (a line segment representing part of an original figure and a auxiliary line segment to be newly formed) is indicated by a solid line.

Timing control circuit 31 is driven by trigger signal TR output from microprocessor 10 and is adapted to control timings in synchronism with clock signal CLK output from microprocessor 10. Cross point detecting unit 32 detects cross point Pa(xl,yl) defined by the line segment and the left side of clipping frame W or its extension line, and outputs flag F1 indicating whether the detected cross point is located on the left side of frame W or not. Cross point detecting unit 33 detects cross point Pb(x2,y2) defined by the line segment and the right side of clipping frame W or its extension line, and outputs flag F2 indicating whether the detected cross point is located on the right side of frame W or not. Cross point detecting unit 34 detects cross point Pc(x3,y3) defined by the line segment and the lower side of frame W or its extension line, and outputs flag F3 indicating whether the detected cross point is located on the lower side of frame W or not. Cross point detecting unit 35 detects cross point Pd(x4,y4) defined by the line segment and the upper side of clipping frame W or its extension line, and outputs flag F4 indicating whether the detected cross point is located on the upper side of frame W.

Bus driver 36 receives coordinate values output from REGs 11 to 18 and coordinate values detected by cross point detecting units 32 to 35, and output them to boundary cutout unit 38. Flag register (FLAG REG) 37 latches flag data F output from timing control circuit 31. Flag data F is identical with the one output from position judgement circuit 30. Boundary cutout unit 38 is started by end signal END output from timing control circuit 31. Boundary cutout unit 38 cuts out a boundary in accordance with data output from bus driver 36 and FLAG REG 37, and outputs coordinate values of a line segment representing the cutout boundary to a display module (not shown).

Figure 6:
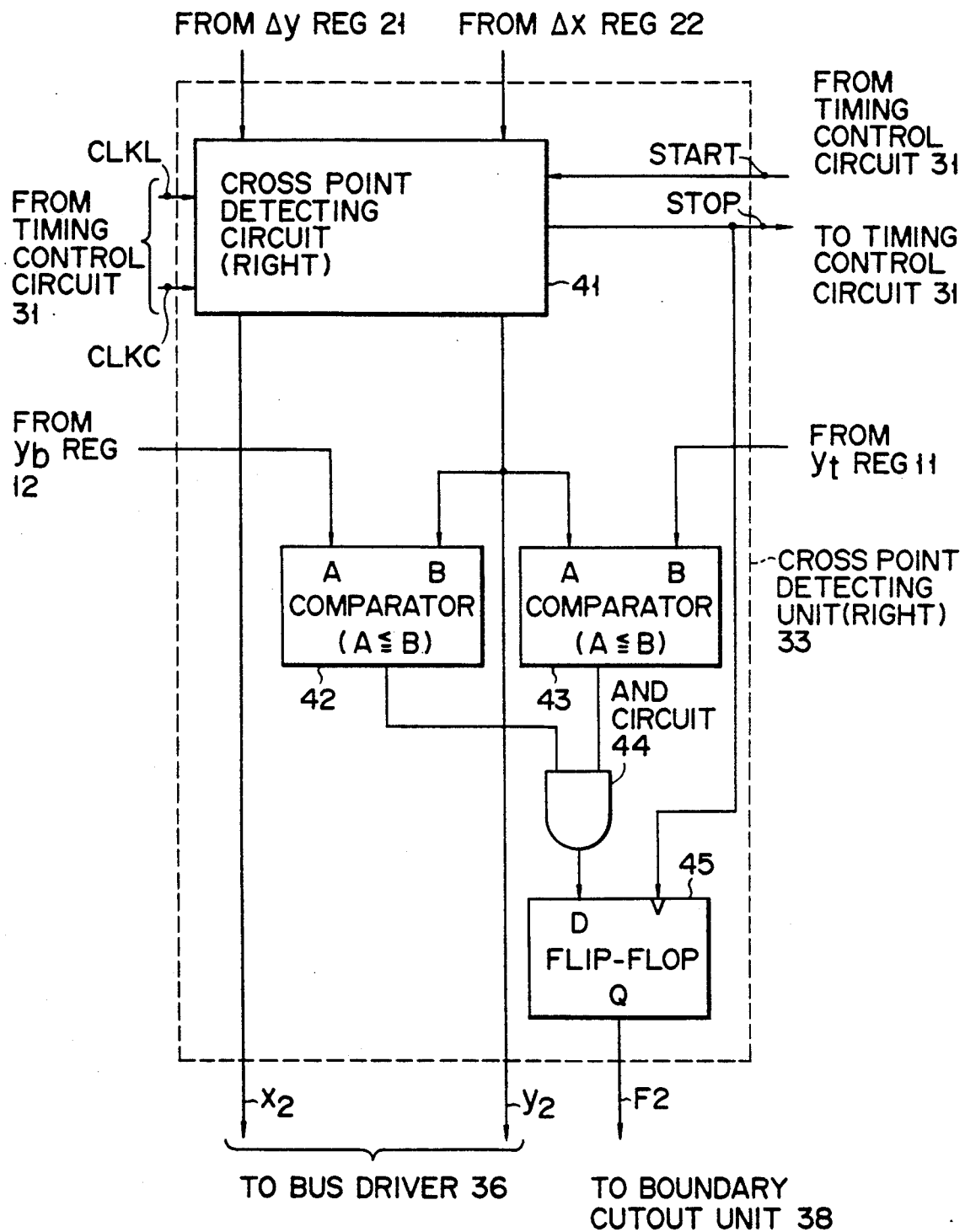
FIG. 6 is a block diagram of a cross point detecting unit.

FIG. 6 is a block diagram of cross point detecting unit 33. Referring to FIG. 6, cross point detecting circuit (RIGHT) 41 detects cross point Pb(x2,y2) defined by the line segment and the right side of clipping frame W or its extension line. An arrangement of cross point detecting circuit 41 is disclosed in Japanese Patent Application No. 60-168053. Comparator 42 compare y-coordinate value y2 of cross point Pb detected by cross point detecting circuit 41 with y-coordinate value yb of the lower side of clipping frame W. Comparator 43 compares y-coordinate value y2 with y-coordinate value yt of the upper side of clipping frame W. Signals output from comparators 42 and 43 are supplied to AND circuit 44. A signal output from AND circuit 44 is latched by flip-flop 45 in accordance with stop signal STOP representing an end of the cross point detecting operation by cross point detecting circuit 41. signal output from flip-flop 45 is used as flag F2. Each of cross point detecting units 32, 34, and 35 has the same circuit arrangement as that of cross point detecting unit 33.

Figure 7:
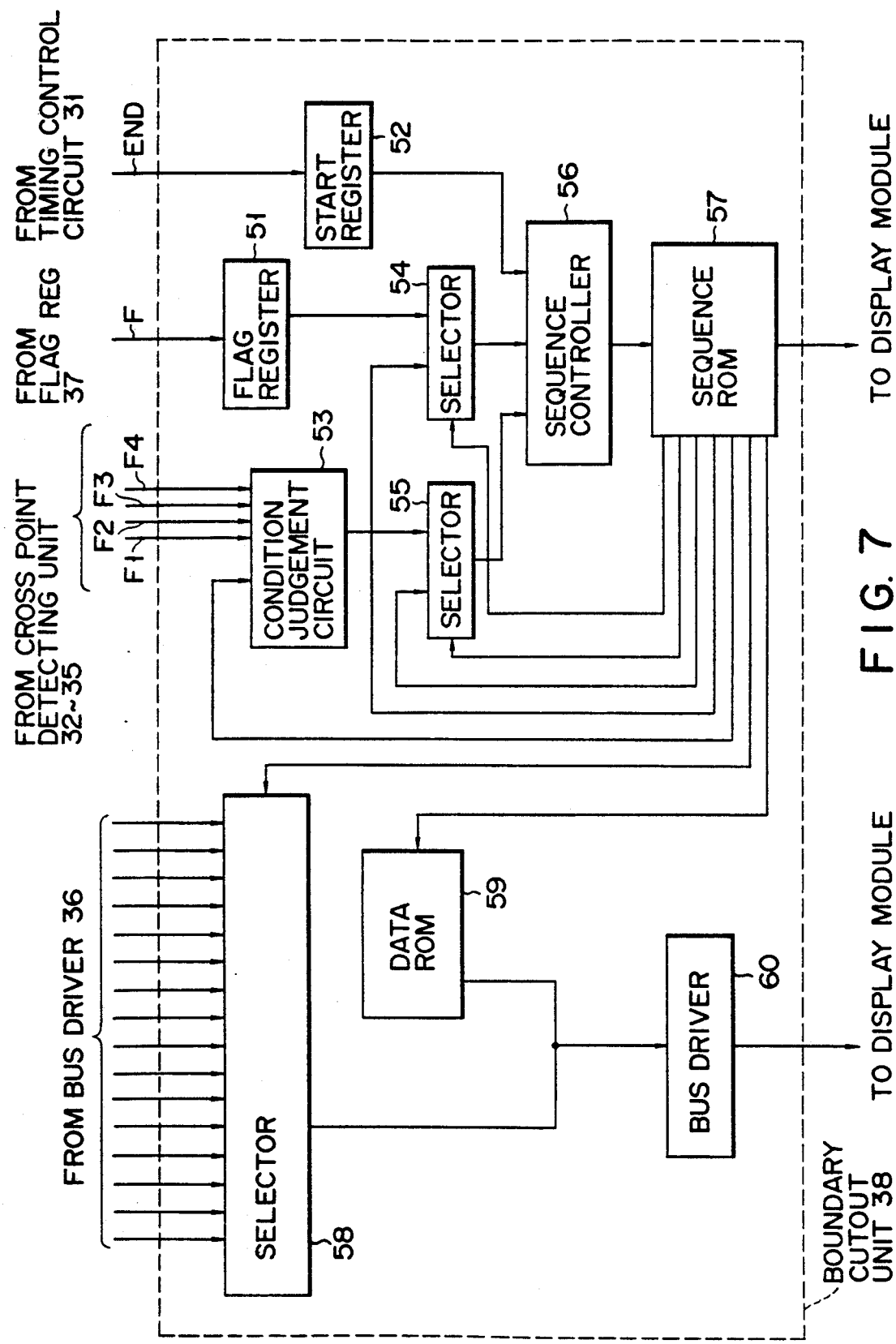
FIG. 7 is a block diagram of a boundary cutout unit.

FIG. 7 is a block diagram of boundary cutout unit 38. Referring to FIG. 7, flag register 51 holds flag data F output from FLAG REG 37. Start register 52 holds end signal END output from timing control circuit 31 as a signal for starting sequence controller 56. Condition judgement circuit 53 judges a condition of a line segment to be extracted using flag data F1 to F4 output from cross point detecting units 32 to 35. Condition judgement circuit 53 comprises AND circuits and OR circuits. Selector 54 performs selection between the flag data held in flag register 51 and data output from sequence ROM 57. Selector 55 performs selection between data output from condition judgement circuit 53 and the data output from sequence ROM 57. Sequence controller 56 performs a sequence control operation in accordance with data output from start register 52, and selectors 54 and 55. Note that sequence ROM 57 stores sequence data required for boundary cutout. Selector 58 selects coordinate values output from bus driver 36 in accordance with a signal output from sequence ROM 57, and outputs them to bus driver 60. Data ROM 59 stores various commands to be output to the display module. Bus drive 60 is used as an interface for the display module.

An operation of the embodiment apparatus of the present invention will be described.

Referring to FIG. 2, coordinate values yt, yb, xr, and xl representing clipping frame W are respectively loaded in yt REG 11, yb REG 12, xr REG 13, and xl REG 14. Coordinate values of start and end points of line segments representing boundaries of a figure to be clipped are sequentially supplied from microprocessor 10 to REGs 15 to 18. Since the boundaries of a figure are defined by continuous line segments (polygonal lines), when a point of each line segment is sequentially supplied, an end point of a line segment coincides with a start point of the next line segment.

Coordinate values of each point of the figure are supplied from microprocessor 10 to xnew and ynew REGs 18 and 17. Timing control circuit 31 is started by trigger signal TR output from microprocessor 10, and output one clock pulse CLKC to xold and yold REGs 16 and 15. As a result, the coordinate values of the point supplied from microcomputer 10 are loaded in xnew and ynew REGs 18 and 17 as end point coordinate values xnew and ynew of a new line segment of the figure to be clipped. At the same time, the coordinate values loaded in REGs 18 and 17 are loaded in xold and yold REGs 16 and 15 as start point coordinate values of the new line segment of the figure to be clipped. Difference $\Delta y$ between coordinate values yold and ynew respectively loaded in yold and ynew REGs 15 and 17 is obtained by SUB 19. Similarly, difference $\Delta x$ between coordinate values xold and xnew respectively loaded in xold and xnew REGs 16 and 18 is obtained by SUB 20. The differences obtained by SUBs 19 and 20 are respectively loaded in shift registers 21 and 22. Then, sign bits representing the signs of differences $\Delta y$ and $\Delta x$ are respectively set in flip-flops 23 and 24.

When new coordinate values are loaded in REGs 17 and 18, flag data related to the previously loaded coordinate values is held in REG 29. In addition, in COMPs 25 to 28, the new coordinate values and the coordinate values of clipping frame W are compared with each other parallelly with the above processing. Output signals from COMPs 25 to 28 are input to position judgement circuit 30 as 4-bit flag data ($f_{new}$) representing an area where the new coordinate values are present in the nine areas defined by clipping frame W and its extension lines. At the same time, flag data ($f_{old}$) previously loaded in REG 29 is input to position judgement circuit 30. Position judgement circuit 30 judges the relationship between the line segment of the figure to be clipped and clipping frame W by comparing the two flag data, i.e., $f_{new}$ and $f_{old}$ data input to position judgement circuit 30, thereby outputting flag data representing a corresponding case of cases 1 to 11 shown in FIGS. 5A to 5P. The flag data is loaded in FLAG REG 37 through timing control circuit 31.

Timing control circuit 31 to be clipped outputs start signal START to independently start at least one of cross point detecting units 32 to 35, which is necessary for cross point detection in accordance with the flag data output from position judgement circuit 30. In addition, timing control circuit 31 starts supplying clock signal CLKC to at least one of cross point detecting units 32 to 35, and shift registers 21 and 22, respectively. When new values are supplied by repeating arithmetic shift by one bit to the right in synchronism with clock signal CLKC supplied from timing control circuit 31, shift registers 21 and 22 respectively obtain ½ initially loaded values.

After at least one of cross point detecting units 32 to 35 is started by the start signal START output from timing control circuit 31, and performs cross point detection by utilizing a middle point calculation algorithm in accordance with the data output from shift registers 21 and 22, and REGs 11 to 14. Cross point detecting units 32 to 35 judge whether the detected cross points are present on sides of clipping frame W or its extension lines, and outputs flags F1 to F4 representing the judgement.

An operation for outputting the above flags will be described with reference to cross point detecting unit 33 shown in FIG. 6.

In cross point detecting unit (RIGHT) 33, coordinate values x2 and y2 of cross point Pb defined by a line segment of the figure to be clipped and the right side of clipping frame W or its extension line are detected by cross point detecting circuit (RIGHT) 41. Comparators 42 and 43 respectively compare y-coordinate value y2 of detected cross point Pb with y-coordinate values yb and yt of the lower and upper sides of clipping frame W. An output signal from comparator 42 is set at logic "1" when $y2 \geq yb$, and logic "0" when $y2 < yb$. An output signal from comparator 43 is set at logic "1" when $y2 \leq yt$, and logic "0" when $y2 > yt$. The signals output from comparators 42 and 43 are supplied to AND circuit 44. When $yb \leq y2 \leq yt$, i.e., the cross point detected by cross point detecting circuit 41 is present on the right side of clipping frame W, a signal output from AND circuit 44 is set at logic "1". When $y2 < yb$ or $y2 > yt$, i.e., the cross point detected by cross point detecting circuit 41 is present on the extension line of the right side of clipping frame W, the signal output from AND circuit 44 is set at logic "0". When cross point detection is completed by cross point detecting circuit 41, the output signal from AND circuit 44 is latched by flip-flop 45 in accordance with stop signal STOP output from cross point detecting circuit 41 to timing control circuit 31. Signal Q output from flip-flop 45 is supplied to boundary cutout unit 38.

Cross points Pa(x1, y1), Pb(x2, y2), Pc(x3, y3), and Pd(x4, y4) respectively detected by cross point detecting units 32 to 35, coordinate values yt, yb, xr, and xl of clipping frame W respectively held in REGs 11 to 14, start point coordinate values xold and yold of the line segment respectively held in REGs 16 and 15, and end point coordinate values thereof respectively held in REGs 18 and 17 are output to selector 58 in boundary cutout unit 38 through bust drive 36. In addition, flags F1 to F4 output from cross point detecting units 32 to 35 are output to condition judgement circuit 53 in boundary cutout unit 38. Flag data F loaded in FLAG REG 37 is output to flag register 51 in boundary cutout unit 38.

Timing control circuit 31 starts some of cross detecting units 32 to 35, and then detects stop signal STOP output from the started cross point detecting units. When stop signal STOP is detected from all the started cross point detecting units, timing control circuit 31 stops outputting clock signal CLKC, and outputs end signal END to sequence controller 56 through start register 52. When sequence controller 56 receives end signal END, it outputs a predetermined address signal to sequence ROM 57. As a result, the following boundary cutout sequence is started.

Selector 54 is switched by a predetermined bit of data output from sequence ROM 57, and flag data F loaded in flag register 51 is input to sequence controller 56. Sequence controller 56 supplies to sequence ROM 57 a start address signal of the boundary cutout sequence data (stored in ROM 57 in units of cases 1 to 11) corresponding to flag data F selected by selector 54. With this operation, a boundary cutout sequence specific to case i (i=1 to 11) represented by flag data F is performed. In this sequence, judgement data, e.g., mask data, are sequentially supplied from sequence ROM 57 to condition judgement circuit 53. When, for example, boundaries to be extracted vary (four variations in case 6) depending on a cross portion of clipping frame W and a line segment to be clipped, as shown in FIGS. 5G to 5J, this mask data is used to specify one of the boundaries. Condition judgement circuit 53 checks the states of flags F1 to F4 using the mask data. In accordance with the check result, the next sequence is determined by sequence ROM 57, and new mask data located at a corresponding address position is read out and supplied to condition judgement circuit 53. By repeating the above operation, one of the four boundaries to be extracted is specified when flag data F represents, e.g., case 6. Thus, a position where a line segment of the figure to be clipped crosses clipping frame W can be specified by flags F1 to F4. By specifying this position, the number of line segments to be drawn and the coordinates of points thereof can be determined.

With the above-described operation, in accordance with the data stored in sequence ROM 57, data ROM 59 supplies to bus driver 60 a command designating the number of line segments to be drawn and the like. The coordinates of points of the line segments to be drawn are sequentially selected by selector 58 and output to bus drive 60. The command array (FIG. 8A), e.g., the coordinate array of the points of the line segment indicated by a solid line in FIG. 8B output from data ROM 59 is transferred from bus drive 60 to the display module. In this case, status information representing the data transfer phase is also transferred to the display module. As shown in FIG. 8C, the above command includes a flag field (FLAG) for designating the number of line segments to be drawn (three in maximum) and a field (OP code) for designating an operation of drawing. In the embodiment, this command is transferred to the display module, and then the coordinate data for a maximum of four points is transferred to the display module. The display module draws a maximum of three line segments by connecting these coordinate points.

As has been described above, while boundaries of a figure are cut out by boundary cutout unit 38, the next coordinate values are supplied from microprocessor 10 as coordinate values of a line segment of the figure to be clipped, and cross point detection and the like can be parallelly performed in cross point detecting units 32 to 35, thereby realizing high-speed clipping processing.

The present invention is not limited to the above-described embodiment, but various changes and modifications can be made without departing from the spirit and scope of the present invention.

What is claimed is:

1. A method of clipping a figure using a clipping frame, comprising the steps of:
    storing a first coordinate value of a first end of a line segment representing a boundary of a figure and a second coordinate value of a second end of said line segment;
    determining which areas of nine areas formed by each side and extension lines of said clipping frame include said first end and said second end;
    determining a boundary type which indicates a positional relationship between said line segment and said clipping frame, utilizing said determined areas, said boundary type being classified into eleven cases;

detecting cross point coordinate values defined by said line segment and sides and extension lines of said clipping frame in accordance with said boundary type; and outputting coordinate values, for clipping said figure, in accordance with aid boundary type and said detected cross point coordinate values.

2. An apparatus for clipping a figure using a clipping frame, said apparatus comprising:

storage means for storing a first coordinate value of a first end of a line segment representing a boundary of a figure and a second coordinate value of a second end of said line segment;

first determining means for determining which areas of nine areas formed by each side and extension line of said clipping frame include said first end and said second end;

second determining means for determining a boundary type which indicates a positional relationship between said line segment and said clipping frame, utilizing said determined areas, said boundary type being classified into eleven cases;

detecting means for detecting cross point coordinate values defined by said line segment and sides and extension lines of said clipping frame in accordance with said boundary type; and output means for outputting coordinate values, for clipping said figure, in accordance with said boundary type and said detected cross point coordinate values.

3. An apparatus according to claim 2, wherein said detecting means further comprises:

a left side cross point detecting means for detecting a left side cross point coordinate value of said line segment, a left side, and a left side extension line of said clipping frame;

a right side cross point detecting means for detecting a right side cross point coordinate value of said line segment, a right side, and a right side extension line of said line segment;

a bottom side cross point detecting means for detecting a bottom side cross point coordinate value of said line segment, a bottom side, and a bottom side extension line of said line segment;

a top side cross point detecting means for detecting a top side cross point coordinate value of said line segment, a top side, and a top side extension line of said line segment.

4. An apparatus according to claim 3, wherein said detecting means drives one or more of said cross point detecting means in accordance with said boundary type.

5. An apparatus according to claim 4, wherein each cross point detecting means outputs data indicating whether a cross point exists on a side or not, respectively, and wherein said outputting means outputs coordinate values in accordance with said boundary type, detected coordinate values, and said data.

* * * * *